(12) United States Patent
Brees

(10) Patent No.: US 8,186,492 B2
(45) Date of Patent: May 29, 2012

(54) ONE WAY CLUTCH

(75) Inventor: William Brees, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 409 days.

(21) Appl. No.: 12/603,146

(22) Filed: Oct. 21, 2009

(65) Prior Publication Data

US 2010/0101914 A1    Apr. 29, 2010

Related U.S. Application Data

(60) Provisional application No. 61/197,251, filed on Oct. 24, 2008.

(51) Int. Cl.
*F16D 41/18* (2006.01)
(52) U.S. Cl. ............................................ 192/46; 60/345
(58) Field of Classification Search ................ 192/41 R, 192/46; 60/345
See application file for complete search history.

(56) References Cited

U.S. PATENT DOCUMENTS

| | | | | |
|---|---|---|---|---|
| 5,918,461 | A | * | 7/1999 | Bacon .............................. 60/343 |
| 6,907,971 | B2 | | 6/2005 | Demir et al. |
| 7,849,990 | B2 | * | 12/2010 | Brees et al. ..................... 192/46 |

* cited by examiner

*Primary Examiner* — Richard M. Lorence
(74) *Attorney, Agent, or Firm* — Simpson & Simpson, PLLC

(57) ABSTRACT

A one way clutch arranged for coupling a transmission having a stator shaft to a torque converter stator including a hub having an outer circumferential edge having a first wall extending perpendicularly therefrom and an inner circumferential edge having a hub spline arranged thereon, the first wall having at least one hub slot, and each of the at least one hub slot has a first length, a substantially cylindrical spring ring having a second wall, the second wall including at least one spring ring slot and at least one spring ring tab arranged adjacent to an open end of the at least one spring ring slot and forming at least a portion of an edge of the at least one spring ring slot, each of the at least one spring ring slot has a second length greater than the first length, the at least one hub slot in registered alignment with the at least one spring ring slot and the at least one spring ring tab arranged within and adjacent to the at least one hub slot and extends radially therethrough and a tab plate having a circumferential edge having at least one tab plate tab extending radially therefrom, the tab plate arranged axially and rotationally displaceable relative to the hub and the spring ring, the at least one tab plate tab is arranged within the at least one hub slot and/or the at least one spring ring slot.

10 Claims, 11 Drawing Sheets

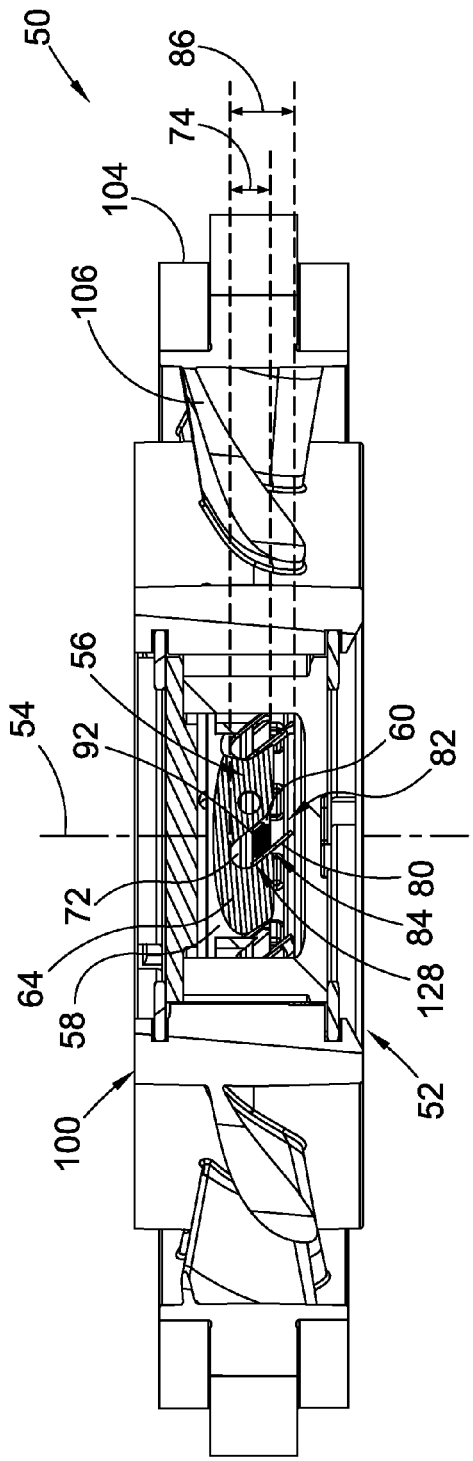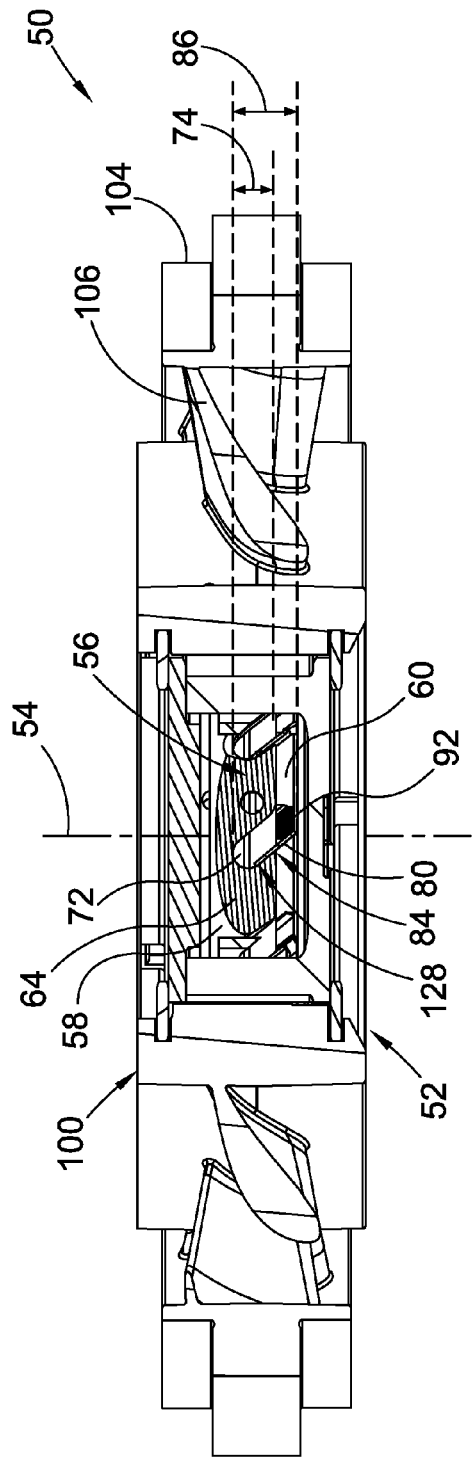

ONE WAY CLUTCH

CROSS-REFERENCE TO RELATED APPLICATIONS

This patent application claims the benefit under 35 U.S.C. §119(e) of U.S. Provisional Patent Application No. 61/197,251, filed Oct. 24, 2008, which application is incorporated herein by reference.

FIELD OF THE INVENTION

The invention broadly relates to torque converters, more specifically to a stator for a torque converter, and even more particularly to a one way clutch used in a stator for a torque converter.

BACKGROUND OF THE INVENTION

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter includes three primary components: an impeller, sometimes referred to as a pump, directly connected to the engine's crankshaft; a turbine, similar in structure to the impeller, however the turbine is connected to the input shaft of the transmission; and, a stator, located between the impeller and turbine, which redirects the flow of hydraulic fluid exiting from the turbine prior to reentry into the pump, thereby providing additional rotational force to the pump. This additional rotational force results in torque multiplication. Thus, for example, when the impeller speed is high and the turbine speed is low, torque may be multiplied by a 2:1 or higher ratio, whereas when the impeller and turbine speeds are approximately the same, torque can be transferred at about a 1:1 ratio.

A separate shaft emanating from the transmission, i.e., the stator shaft, enters the torque converter and provides a rotationally fixed mount for the stator. Often torque converters include a one-way clutch between the stator and the stationary stator shaft which permits the stator to rotate in response to changing fluid forces resulting from increased turbine speed, i.e., as the turbine speed increases in response to increased pump speed. Thus, when the pump rotates more quickly than the turbine, the stator remains stationary. While contrarily, as the turbine rotation speed approaches the speed of the pump, the stator begins to rotate due to increased fluid forces. When the turbine rotates at substantially the same speed as the pump, the stator freewheels, and as described supra, torque is transmitted at approximately a 1:1 ratio between the engine and the transmission.

A prior art stator having a one way clutch is shown in FIGS. 1A and 1B. The above-described stator 10 broadly comprises stator casting 12, outer race 14 and inner race 16. Stator casting 12 is rotationally fixed to outer race 14, and under various conditions, outer and inner races 14 and 16, respectively, are either rotationally fixed or free to rotate relative to each other. Springs 18 and rollers 20 are disposed about and between outer and inner races 14 and 16, respectively. During instances when the pump rotates more quickly than the turbine, i.e., the stator remains stationary, springs 18 have sufficient force to press rollers 20 within wedged areas 22, i.e., the area formed between outer and inner races 14 and 16, respectively. (See FIG. 1B). During such conditions, the inner and outer races are rotationally fixed to each other thereby preventing stator casting 12 having blades 24 from rotating. Thus, in this instance, stator 10 redirects the fluid passing from the turbine back to the pump. During instances when the pump rotates at substantially the same speed as the turbine, i.e., the stator freewheels. During such conditions, the blades rotate in the direction of the pump and fluid is not redirected as it passes from the turbine to the pump. In short, during a lockup condition, stator 10 is rotationally fixed to the transmission housing via the stator shaft, while during a freewheel condition, stator 10 may freely rotate relative to the stator shaft and thereby the transmission housing.

In addition to the above described one way clutch for a torque converter stator, many other arrangements have been disclosed in the art. For example, several manufacturers have designed ratchet type one way clutches which use individual strut elements in both radial and axial directions. See, for example, U.S. Pat. No. 6,907,971 which discloses a ratchet type clutch system that is designed to enable lockup of the ratchet in one direction and slippage in the opposite direction.

The prior art one way clutch designs have a variety of problems. For example, the one way clutch type shown in FIGS. 1A and 1B, also known as roller and sprag clutches, are expensive due to high component costs combined with high assembly costs. Although the ratchet type one way clutches, for example having individual struts, have lower component costs, this type of one way clutch still is expensive to assemble.

As can be derived from the variety of devices and methods directed at providing a one way clutch in a torque converter stator, many means have been contemplated to accomplish the desired end, i.e., clutch lockup below a particular torque level and clutch freewheeling above that particular torque level. Heretofore, tradeoffs between component and assembly cost and performance were required. Thus, there is a long-felt need for a one way clutch for a torque converter stator that is easy to assemble, includes inexpensive component parts and provides a high level of performance.

BRIEF SUMMARY OF THE INVENTION

The present invention broadly comprises a one way clutch arranged for coupling a transmission having a stator shaft to a torque converter stator, wherein the torque converter stator includes an axis of rotation. The one way clutch includes a hub having an outer circumferential edge having a first wall extending perpendicularly therefrom and an inner circumferential edge having a hub spline arranged thereon, the first wall having at least one hub slot, and each of the at least one hub slot has a first length. The one way clutch further includes a substantially cylindrical spring ring having a second wall, the second wall including at least one spring ring slot and at least one spring ring tab arranged adjacent to an open end of the at least one spring ring slot and forming at least a portion of an edge of the at least one spring ring slot, each of the at least one spring ring slot has a second length greater than the first length, the at least one hub slot in registered alignment with the at least one spring ring slot and the at least one spring ring tab arranged within and adjacent to the at least one hub slot and extends radially therethrough. The one way clutch yet further includes a tab plate having a circumferential edge having at least one tab plate tab extending radially therefrom, the tab plate arranged axially and rotationally displaceable relative to the hub and the spring ring, the at least one tab plate tab is arranged within the at least one hub slot and/or the at least one spring ring slot. In this embodiment, during a lockup condition of the one way clutch, the tab plate is rotationally fixed relative to the hub and the spring ring and the at least one tab plate tab contacts at least one wall of the at least one hub slot and/or the at least one spring ring slot, and during a freewheel condition of the one way clutch, the tab plate rotates relative to the hub and the spring ring and the at least one tab plate tab contacts the at least one spring ring tab.

In some embodiments, the hub includes a hub outer diameter, the spring ring includes a spring ring inner diameter larger than the hub outer diameter, the at least one spring ring tab extends radially inwardly towards the axis of rotation, the circumferential edge of the tab plate is an outer circumferential edge and the at least one tab plate tab extends radially outwardly therefrom. In some of these embodiments, the one way clutch further includes a stator casting having an outer circumferential edge having a plurality of stator blades arranged thereabout and an inner circumferential edge having a casting spline arranged thereon and a connection plate having an outer circumferential edge having a connection plate outer spline arranged thereon and an inner circumferential edge having a connection plate inner spline arranged thereon, the connection plate outer spline adapted to rotationally engage the casting spline, wherein the tab plate further includes an inner circumferential edge having a tab plate spline arranged thereon, the tab plate spline adapted to rotationally engage the connection plate inner spline.

In other embodiments, the hub includes a hub outer diameter, the spring ring includes a spring ring outer diameter smaller than the hub outer diameter, the at least one spring ring tab extends radially outwardly away from the axis of rotation, the circumferential edge of the tab plate is an inner circumferential edge and the at least one tab plate tab extends radially inwardly therefrom. In some of these embodiments, the one way clutch further includes a stator casting having an outer circumferential edge having a plurality of stator blades arranged thereabout and an inner circumferential edge having a casting spline arranged thereon and a connection plate having an outer circumferential edge having a connection plate outer spline arranged thereon, the connection plate outer spline having an inner surface with a second spline arranged thereon, the connection plate outer spline adapted to rotationally engage the casting spline, wherein the tab plate further includes an outer circumferential edge having a tab plate spline arranged thereon, the tab plate spline adapted to rotationally engage the second spline.

In still other embodiments, the first wall further includes at least one opening therethrough, the second wall further includes at least one dimple therein, and the at least one dimple is positioned within the at least one opening, while in yet other embodiments, during the lockup condition, the at least one spring ring tab is in contact with an edge of the at least one hub slot. In still yet other embodiments, during a transition from the freewheel condition to the lockup condition, the at least one spring ring tab is arranged to guide the at least one tab plate tab into the at least one hub slot.

In still further embodiments, the at least one hub slot is a helical slot, a linear slot or a curved slot, and in yet further embodiments, the at least one spring ring slot is a helical slot, a linear slot or a curved slot.

It is a general object of the present invention to provide an inexpensive and reliable one way clutch for a torque converter stator.

It is another general object of the present invention to provide a one way clutch for a torque converter stator that locks below a particular torque level and freewheels above that particular torque level.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 6A is a cross sectional view of the torque converter stator of FIG. 2 taken generally along line 6A-6A of FIG. 4 showing an embodiment of the present invention one way clutch in a lockup condition;

FIG. 6B is a cross sectional view of the torque converter stator of FIG. 2 taken generally along line 6A-6A of FIG. 4 showing an embodiment of the present invention one way clutch in a freewheel condition;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be appreciated that by rotationally connected, engaged or secured, we mean that two components are connected such that the components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

Figure 1A:
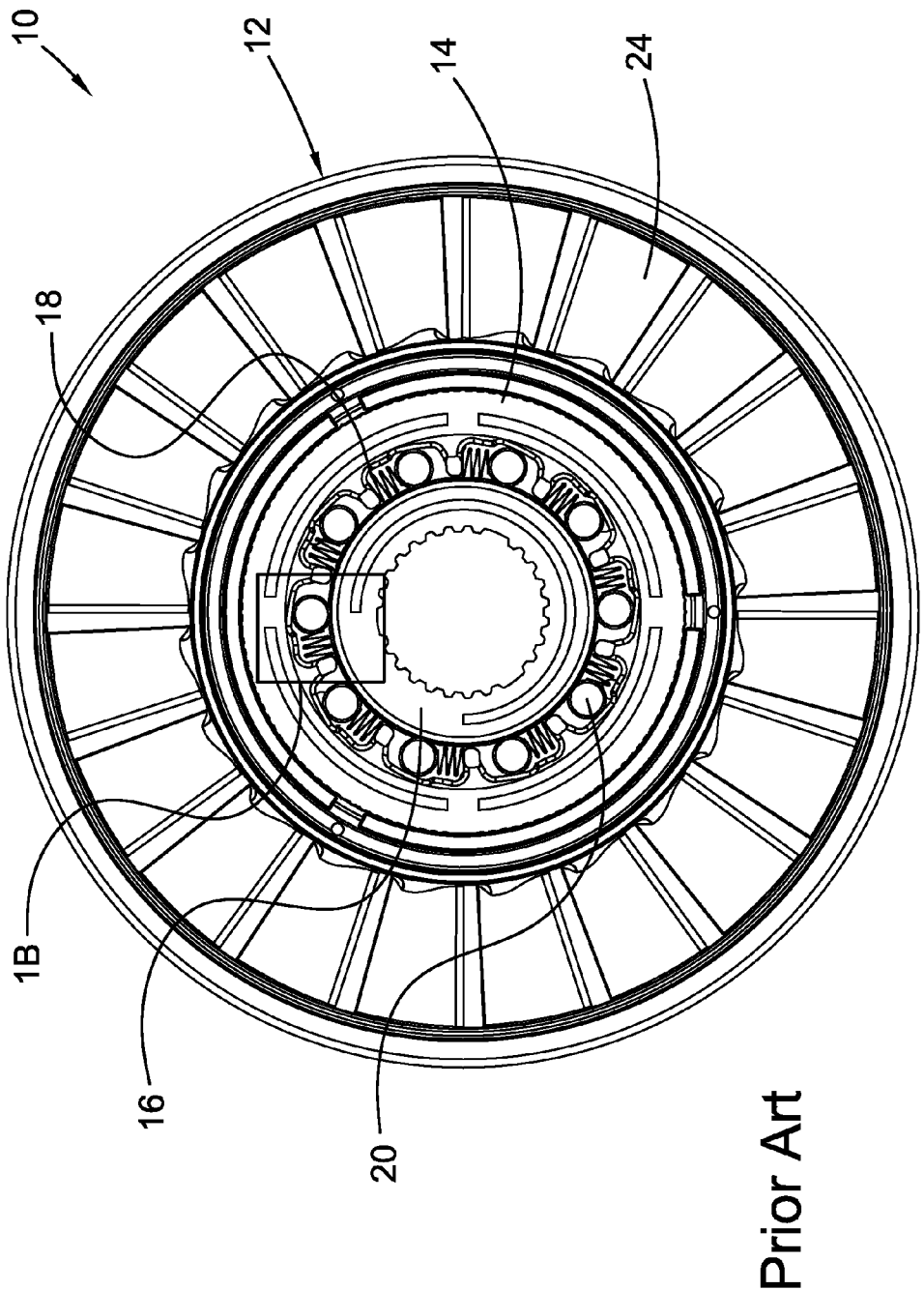
FIG. 1A is a front plan view of a torque converter stator showing a prior art one way clutch.
Figure 1B:
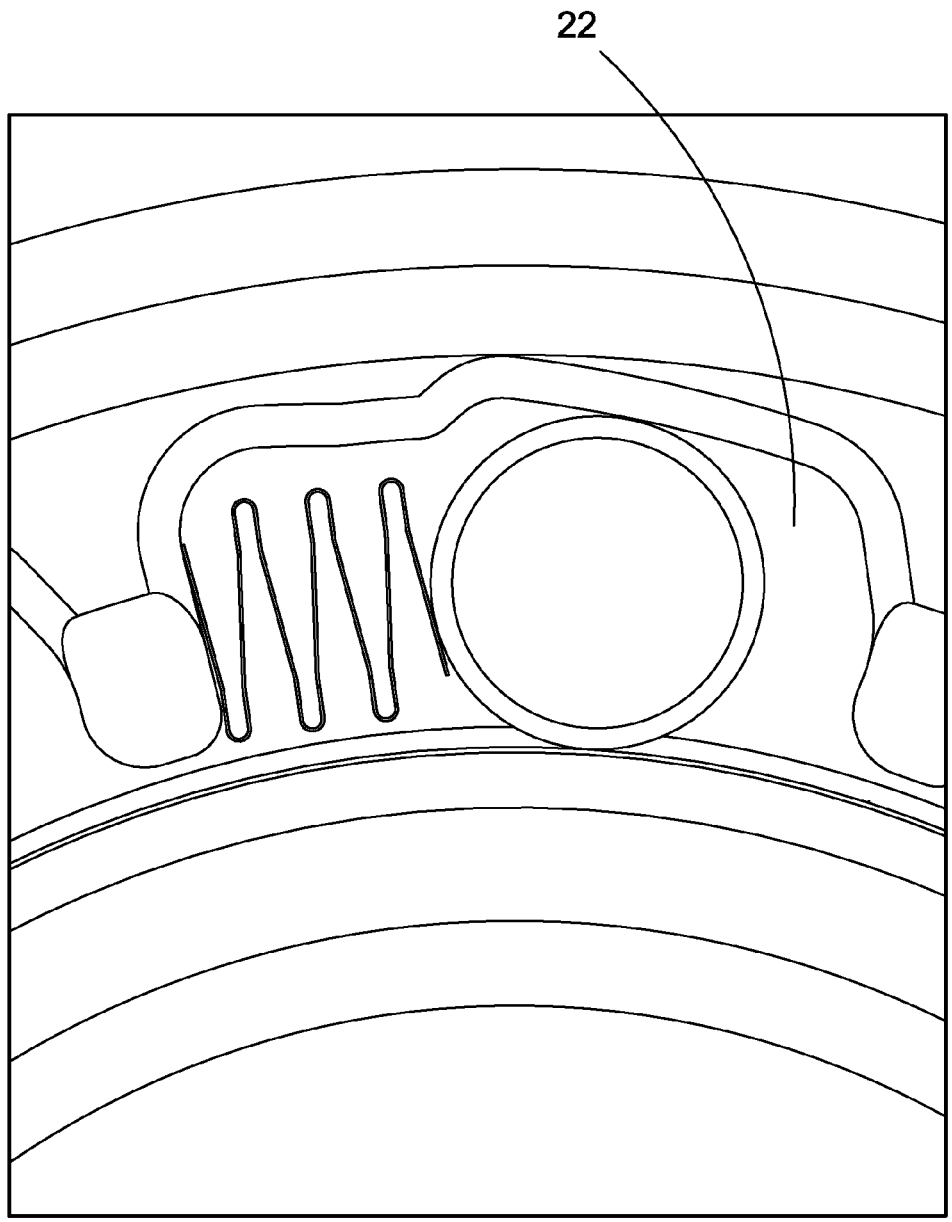
FIG. 1B is a partial front plan view of the torque converter stator of FIG. 1A showing the encircled region 1B of FIG. 1A showing a roller in a locked arrangement.
Figure 2:
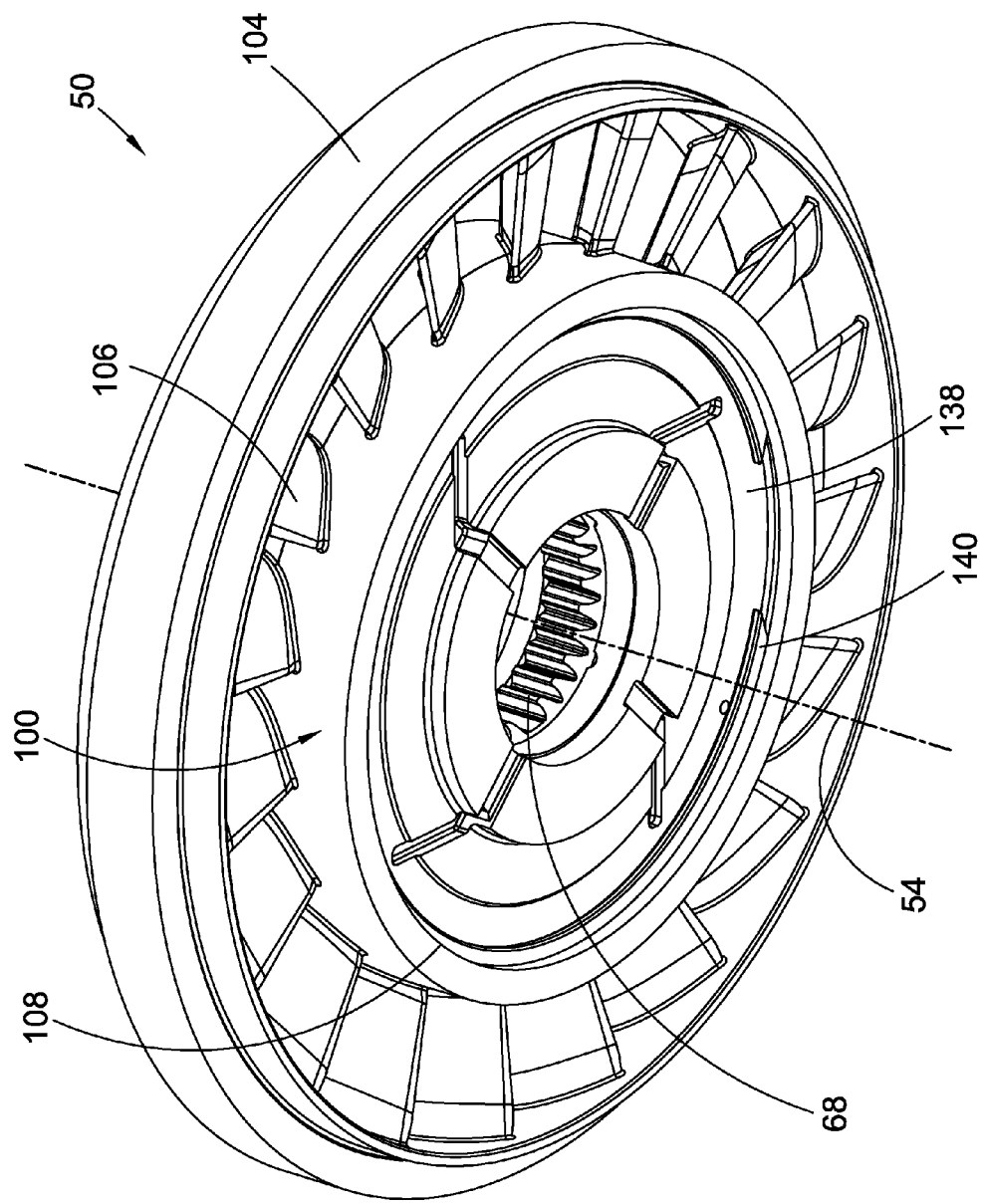
FIG. 2 is a perspective view of a torque converter stator including a present invention one way clutch.
Figure 3A:
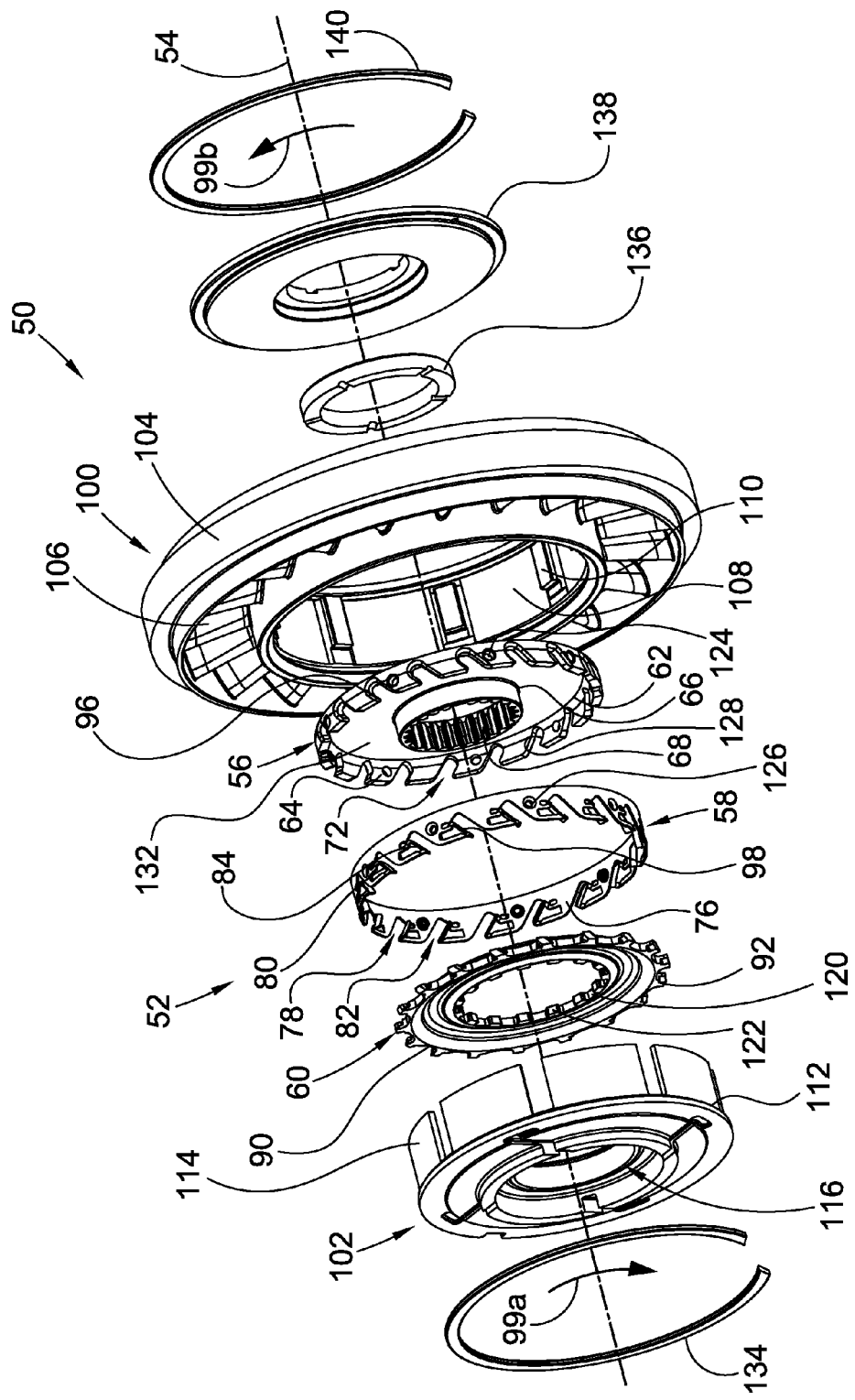
FIG. 3A is an exploded perspective view of torque converter stator of FIG. 2 viewed from a first direction.
Figure 3B:
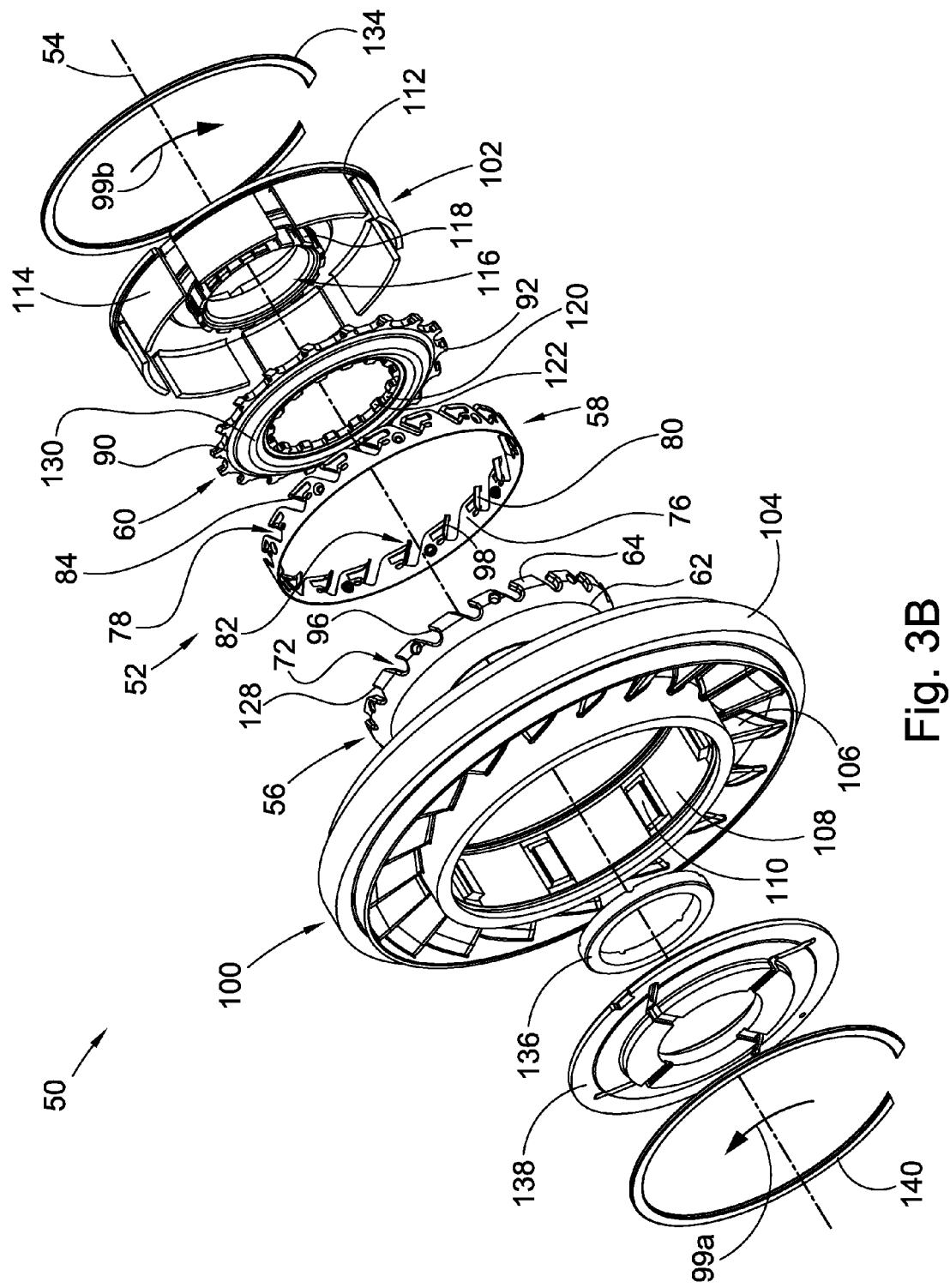
FIG. 3B is an exploded perspective view of torque converter stator of FIG. 2 viewed from a second direction.
Figure 4:
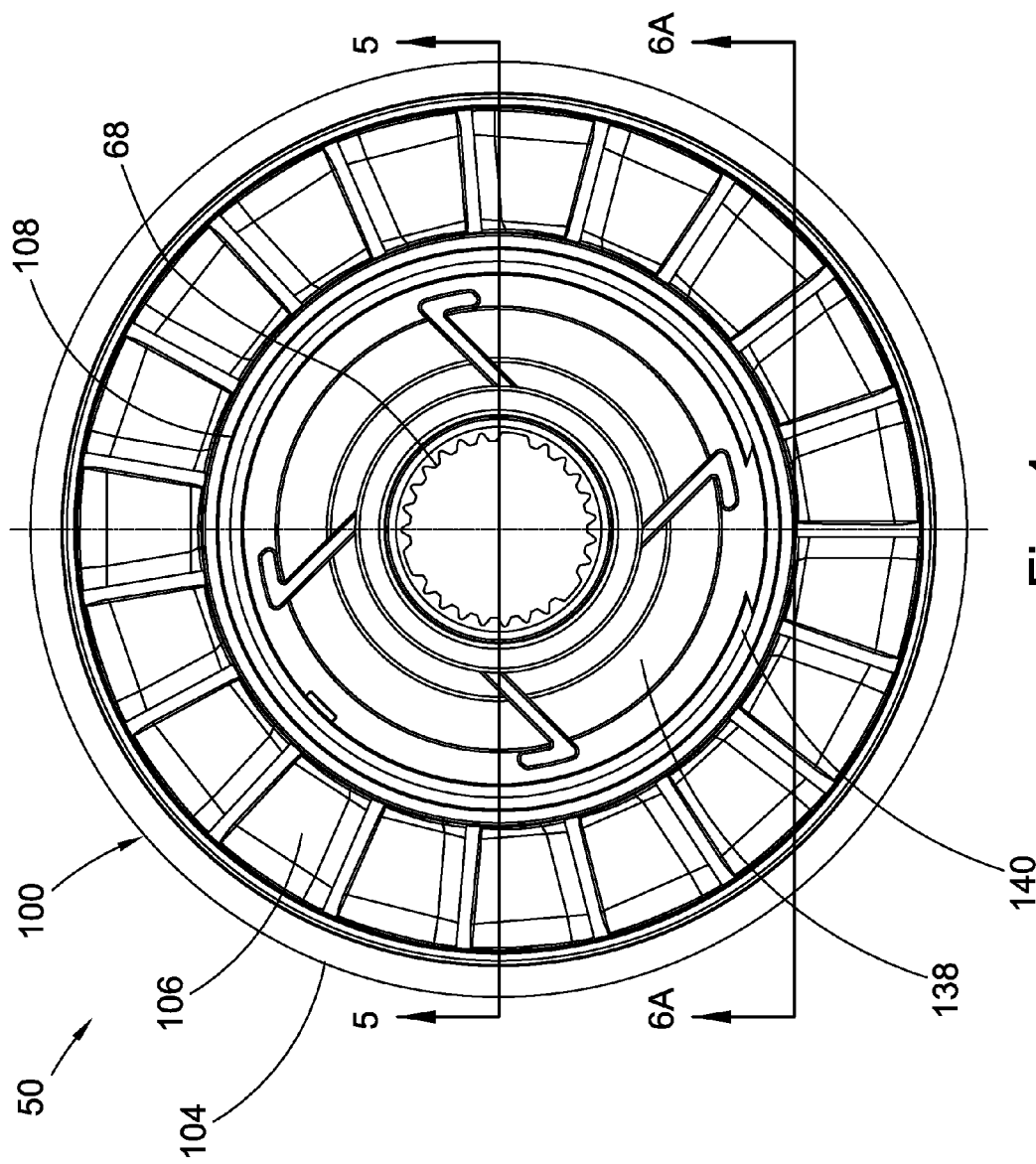
FIG. 4 is a front plan view of the torque converter stator of FIG. 2.
Figure 5:
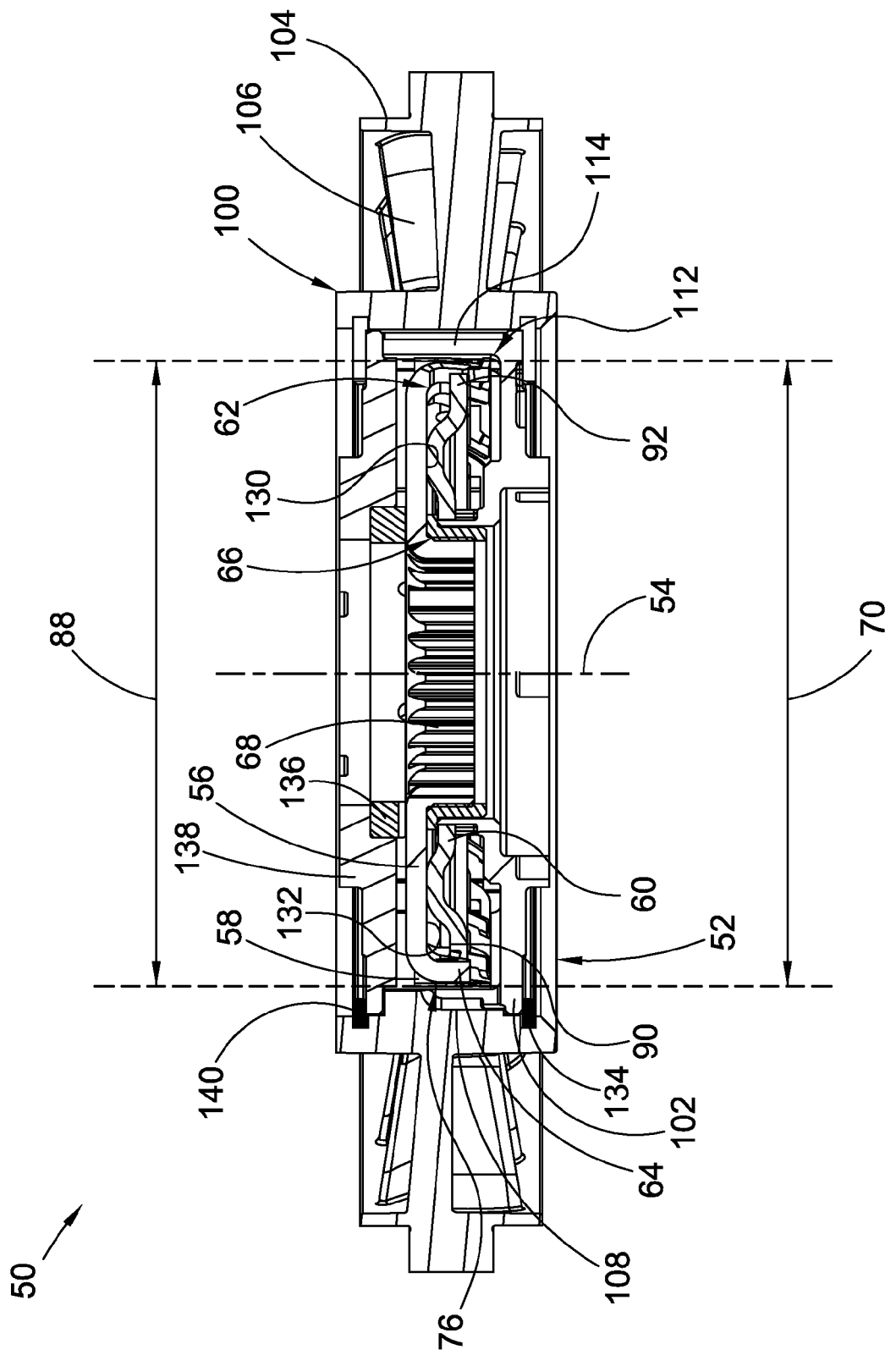
FIG. 5 is a cross sectional view of the torque converter stator of FIG. 2 taken generally along line 5-5 of FIG. 4.
Figure 7:
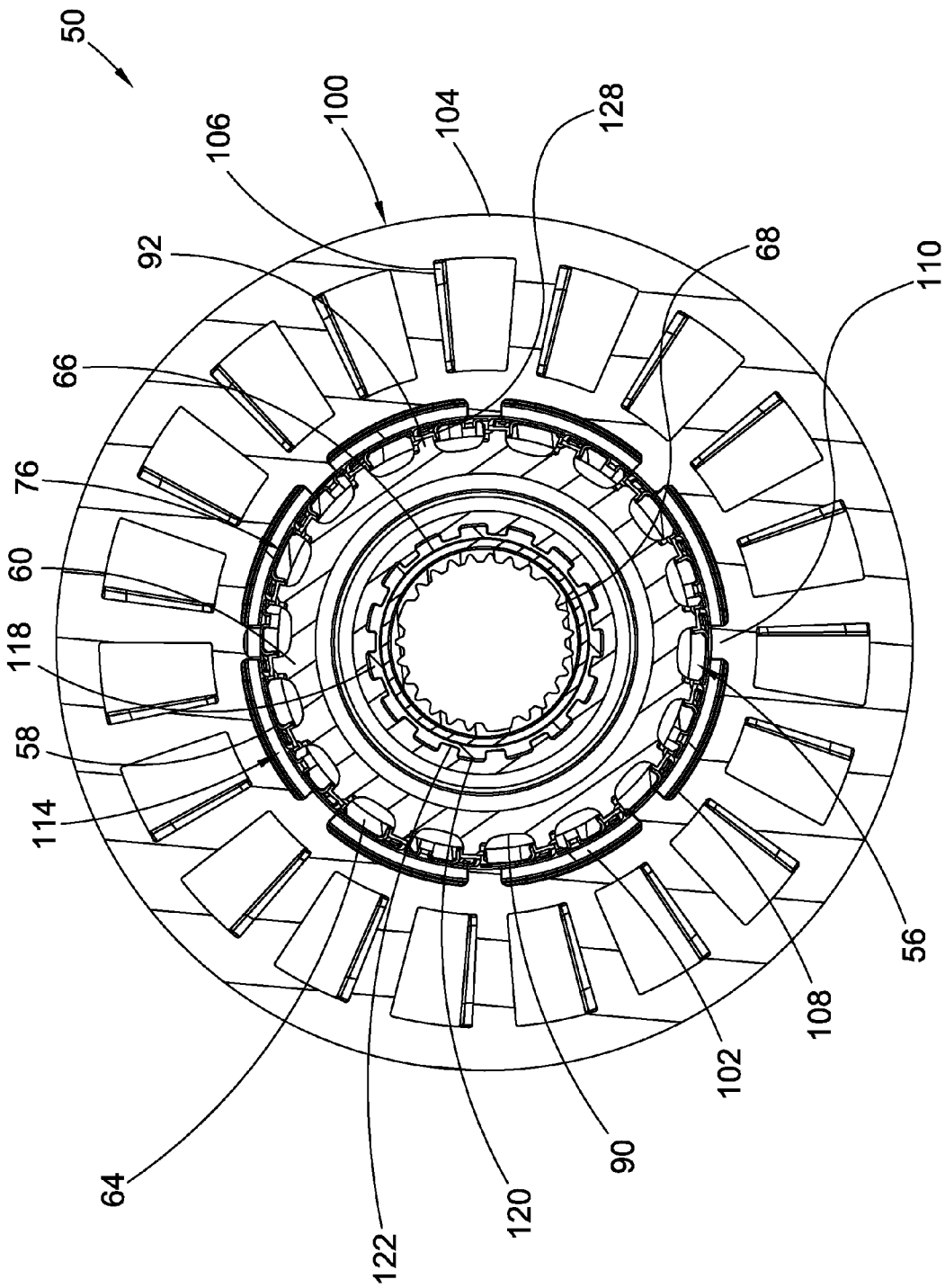
FIG. 7 is a cross sectional view of the torque converter stator of FIG. 2 taken generally along the plane parallel to the view shown in FIG. 4.
Figure 8:
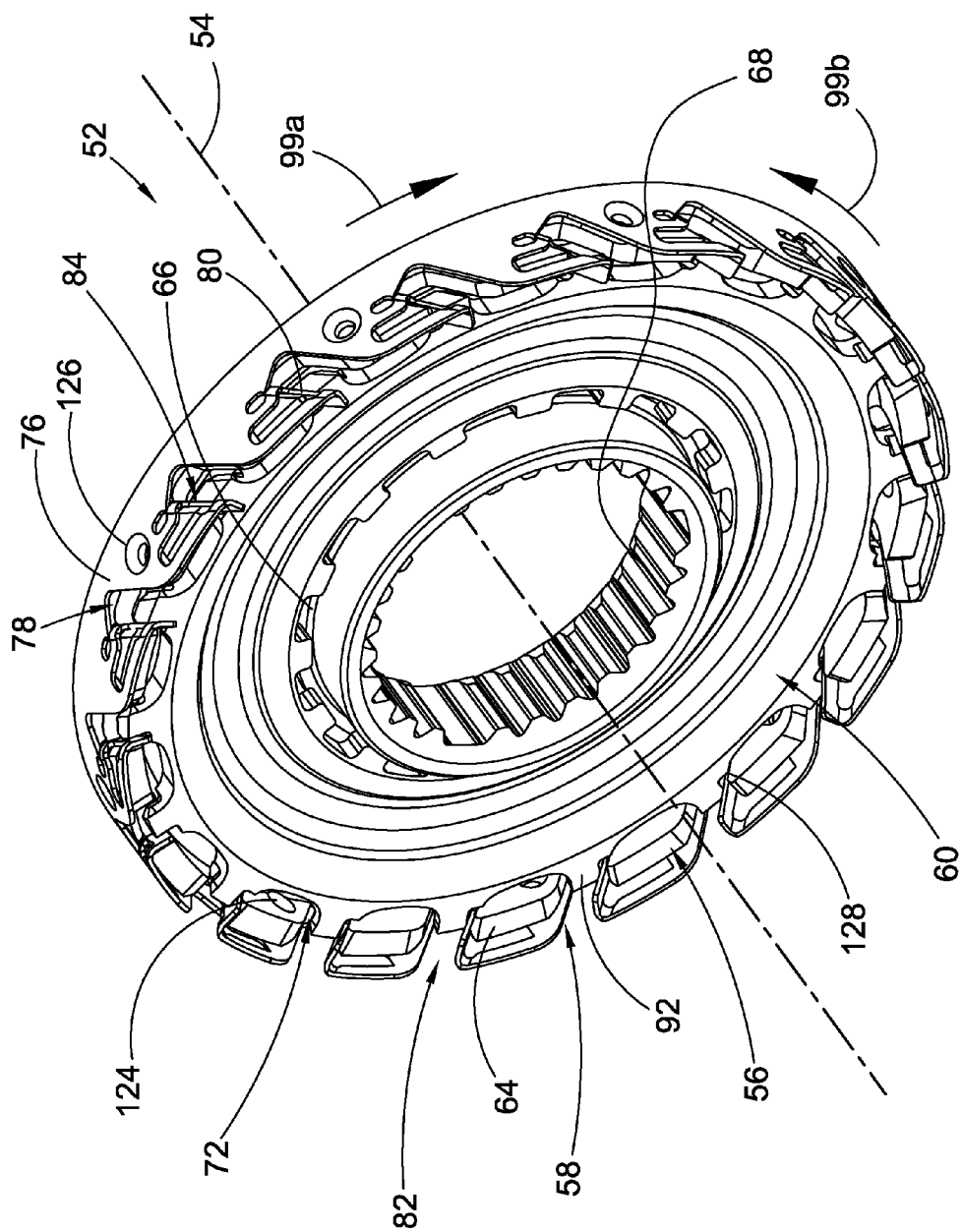
FIG. 8 is a perspective view of an embodiment of a present invention one way clutch; and, FIG. 9 is a partial cross sectional view of a torque converter stator similar to the torque converter shown in FIG. 2 taken generally along a line similar to line 5-5 of FIG. 4 and showing another embodiment of the present invention one way clutch.

Adverting now to the figures, FIG. 2 shows a perspective view of torque converter stator 50 including a present invention one way clutch (not shown). FIG. 3A shows an exploded perspective view of torque converter stator 50 viewed from a first direction, while FIG. 3B shows an exploded perspective view of torque converter stator 50 viewed from a second direction. FIG. 4 shows a front plan view of torque converter stator 50, and FIG. 5 shows a cross sectional view of torque converter stator 50 taken generally along line 5-5 of FIG. 4. FIG. 6A shows a cross sectional view of torque converter stator 50 taken generally along line 6A-6A of FIG. 4 showing an embodiment of the present invention one way clutch 52 in a lockup condition, while FIG. 6B shows a cross sectional view of torque converter stator 50 taken generally along line 6A-6A of FIG. 4 showing an embodiment of the present invention one way clutch 52 in a freewheel condition. FIG. 7 shows a cross sectional view of torque converter stator 50 taken generally along the plane parallel to the view shown in FIG. 4. Lastly, FIG. 8 shows a perspective view of an embodiment of the present invention one way clutch 52. The following discussion is best understood in view of FIGS. 2 through 8.

One way clutch 52 is arranged for coupling a transmission (not shown) having a stator shaft (not shown) to torque converter stator 50, wherein torque converter stator 50 comprises axis of rotation 54. One way clutch 52 comprises hub 56, spring ring 58 and tab plate 60. Hub 56 comprises outer circumferential edge 62 having first wall 64 extending perpendicularly therefrom. Hub 56 further comprises inner circumferential edge 66 having hub spline 68 arranged thereon and further includes an outer diameter, i.e., hub outer diameter 70. First wall 64 comprises at least one hub helical slot 72 and each of the at least one hub helical slots 72 has a length, i.e., first length 74. It should be appreciated that as stator shafts are well known in the art, one has not been shown in the figures. It should be further appreciated that, when in use, hub 56 is rotationally engaged to the stator shaft via spline 68. Therefore, as the stator shaft is rotationally fixed, hub 56 is also rotationally fixed. Moreover, as shown in the figures, hub 56 may include a plurality of helical slots 72 arranged about first wall 64. Additionally, although slots 72 are depicted as substantially linear, one of ordinary skill in the art appreciates that other shapes are also possible, e.g., curved, and such variations are within the spirit and scope of the claimed invention.

One way clutch 52 further comprises spring ring 58 which is substantially cylindrical. Spring ring 58 comprises second wall 76 and second wall 76 comprises at least one spring ring helical slot 78 and at least one spring ring tab 80. The at least one spring ring tab 80 is arranged adjacent to open end 82 of the at least one spring ring helical slot 78. The at least one spring ring tab 80 forms at least a portion of edge 84 of the at least one spring ring helical slot 78. Moreover, each of the at least one spring ring helical slots 78 has a length, i.e., second length 86, and second length 86 is greater than first length 74. It should be appreciated that, as shown in the figures, the present invention spring ring 58 may include a plurality of helical slots 78 and a plurality of tabs 80 arranged about second wall 76. Spring ring 58 has an inner diameter, i.e., spring ring inner diameter 88, and spring ring inner diameter 88 is larger than hub outer diameter 70. The at least one hub helical slot 72 is in registered alignment with the at least one spring ring helical slot 78. The at least one spring ring tab 80 is arranged within and adjacent to the at least one hub helical slot 72 and extends radially toward axis of rotation 54. It should be appreciated that although in the figures spring ring 58 is shown to be radially larger than hub 56, other variations are also possible, e.g., spring ring 58 may be positioned radially within hub 56, or in other words radially smaller than hub 56, and such variations are within the spirit and scope of the claimed invention.

Furthermore, one way clutch 52 yet further comprises tab plate 60. Tab plate 60 comprises outer circumferential edge 90 having at least one tab plate tab 92 extending radially therefrom. Tab plate 60 is arranged axially and rotationally displaceable relative to hub 56 and spring ring 58. The at least one tab plate tab 92 is arranged within the at least one hub helical slot 72 and/or said at least one spring ring helical slot 78. In other words, in some instances tabs 92 will be positioned within both helical slots 72 and 78 simultaneously, and in other instances, tabs 92 will be positioned within only slots 78. It should be appreciated that although in FIGS. 1-8 tab plate 60 is shown to be radially smaller than spring ring 58 and hub 56, other variations are also possible, e.g., tab plate 60 may be positioned radially outside of spring ring 58 and/or hub 56, and such variations are within the spirit and scope of the claimed invention. In such embodiments, the at least one tab plate tab 92 may extend radially inwardly toward spring ring 58 and/or hub 56, and the at least one spring ring tab 80 may extend radially outwardly toward tab plate 60. This embodiment is shown in FIG. 9 and described infra.

During a lockup condition of one way clutch 52, tab plate 60 is rotationally fixed relative to hub 56 and spring ring 58. Additionally, the at least one tab plate tab 92 contacts at least one wall, e.g., wall 96 or 98, of the at least one hub helical slot 72 and/or the at least one spring ring helical slot 78. Alternatively, during a freewheel condition of one way clutch 52, tab plate 60 rotates relative to hub 56 and spring ring 58. Additionally, the at least one tab plate tab 92 contacts the at least one spring ring tab 80. Spring ring 58 via the position of tabs 80 relative to slots 72 allows movement of tabs 92 in one direction only, i.e., curved uni-directional arrow 99a, while preventing rotation in the opposite direction, i.e., curved uni-directional arrow 99b.

In some embodiments, one way clutch 52 further comprises stator casting 100 and connection plate 102. Stator casting 100 comprises outer circumferential edge 104 having a plurality of stator blades 106 arranged thereabout and inner circumferential edge 108 having casting spline 110 arranged thereon. Connection plate 102 comprises outer circumferential edge 112 having connection plate outer spline 114 arranged thereon and inner circumferential edge 116 having connection plate inner spline 118 arranged thereon. Connection plate outer spline 114 is adapted to rotationally engage casting spline 110. Moreover, tab plate 60 further comprises inner circumferential edge 120 having tab plate spline 122 arranged thereon. Tab plate spline 122 is adapted to rotationally engage connection plate inner spline 118. In view of the foregoing, it should be appreciated that tab plate 60 moves axially along spline 118 as one way clutch 52 progress between lockup and freewheel conditions, i.e., as tabs 92 move within slots 72 and/or 78.

Figure 9:
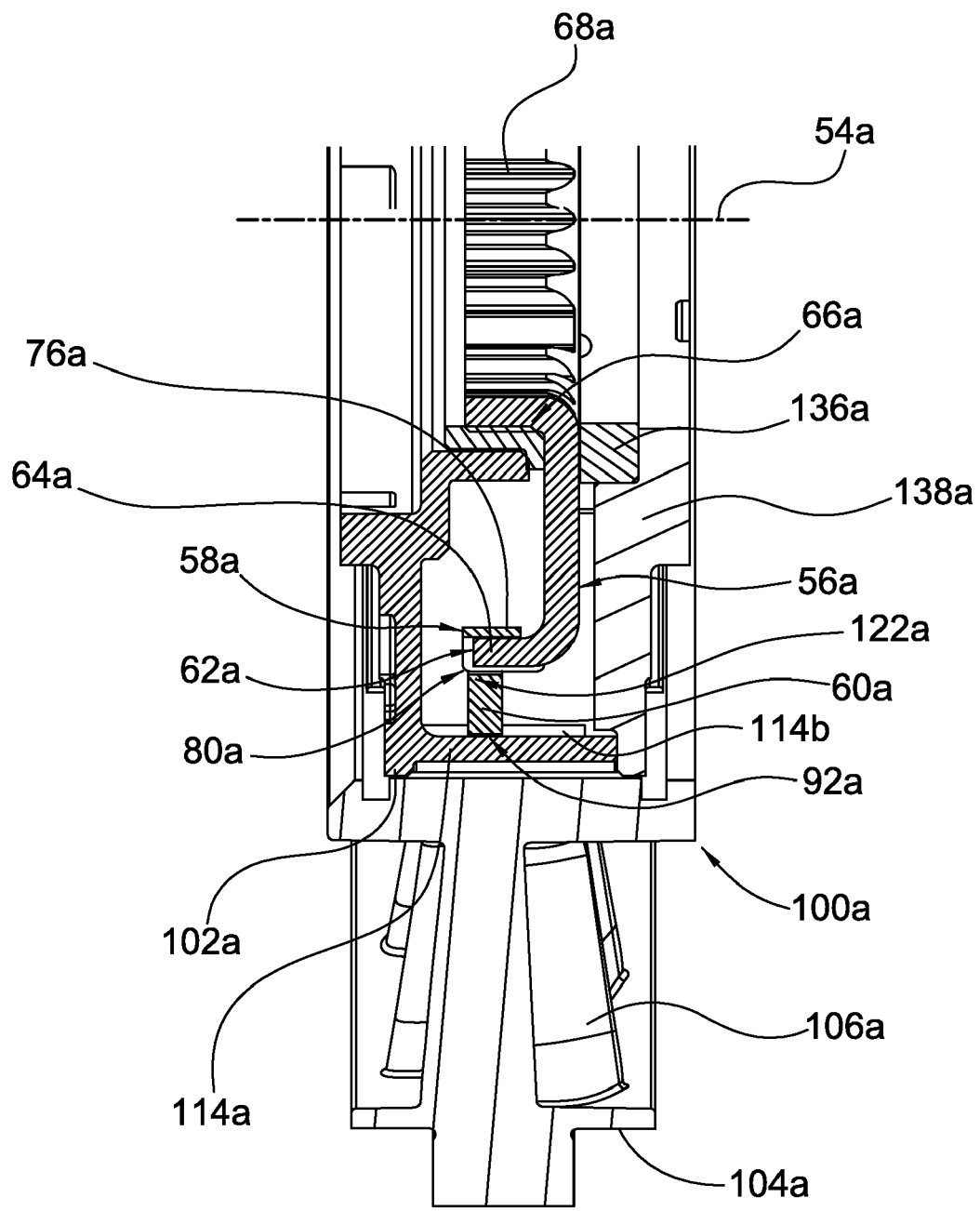

FIG. 9 shows a partial cross sectional view of a torque converter stator similar to the torque converter shown in FIG. 2 taken generally along a line similar to line 5-5 of FIG. 4 and showing another embodiment of the present invention. It should be appreciated that like numbers represent like structures, e.g., hub 56 is similar to hub 56a. In the embodiment shown in FIG. 9, the one way clutch is arranged for coupling a transmission (not shown) having a stator shaft (not shown) to the torque converter stator, wherein the torque converter stator comprises an axis of rotation 54a. The one way clutch comprises hub 56a, spring ring 58a and tab plate 60a. Hub 56a comprises outer circumferential edge 62a having first wall 64a extending perpendicularly therefrom. Hub 56a further comprises inner circumferential edge 66a having a hub spline 68a arranged thereon and further includes an outer diameter, i.e., a hub outer diameter. First wall 64a comprises at least one hub helical slot and each of the at least one hub helical slots has a length, i.e., a first length. It should be further appreciated that, when in use, hub 56a is rotationally engaged to the stator shaft via spline 68a. Therefore, as the stator shaft is rotationally fixed, hub 56a is also rotationally fixed. Moreover, as shown in the figures, hub 56a may include a plurality of helical slots arranged about first wall 64a. Additionally, although the slots are described as substantially linear, one of ordinary skill in the art appreciates that other shapes are also possible, e.g., curved, and such variations are within the spirit and scope of the claimed invention.

This embodiment of the one way clutch further comprises spring ring 58a which is substantially cylindrical. Spring ring 58a comprises second wall 76a and second wall 76a comprises at least one spring ring helical slot and at least one spring ring tab 80a. The at least one spring ring tab 80a is arranged adjacent to the open end of the at least one spring ring helical slot. The at least one spring ring tab 80a forms at least a portion of the edge of the at least one spring ring helical slot. Moreover, each of the at least one spring ring helical slots has a length, i.e., a second length, and the second length is greater than the first length. It should be appreciated that, as shown in the figures, the present invention spring ring 58a may include a plurality of helical slots and a plurality of tabs 80a arranged about second wall 76a. Spring ring 58a has an outer diameter, i.e., the spring ring outer diameter, and the spring ring outer diameter is smaller than the hub outer diameter. The at least one hub helical slot is in registered alignment with the at least one spring ring helical slot. The at least one spring ring tab 80a is arranged within and adjacent to the at least one hub helical slot and extends radially outwardly from axis of rotation Ma. In other words, spring ring 58a is positioned radially within hub 56a, or in other words radially smaller than hub 56a.

Furthermore, this embodiment of the one way clutch yet further comprises tab plate 60a. Tab plate 60a comprises an outer circumferential edge having spline 92a extending radially outwardly therefrom and at least one tab plate tab 122a. Tab plate 60a is arranged axially and rotationally displaceable relative to hub 56a and spring ring 58a. Spline 92a is arranged within second spline 114b which is on the inner surface of spline 114a. The at least one tab plate tab 122a is arranged in the at least one hub helical slot and/or the at least one spring ring helical slot. In other words, in some instances tabs 122a will be positioned within both sets of helical slots simultaneously, and in other instances, tabs 122a will be positioned within only the slots of spring ring 58a. Thus, tab plate 60a may be positioned radially outside of spring ring 58a and/or hub 56a, and the at least one tab plate tab 122a extends radially inwardly toward spring ring 58a and/or hub 56a, and the at least one spring ring tab 80a may extend radially outwardly toward tab plate 60a.

During a lockup condition of this embodiment of the one way clutch, tab plate 60a is rotationally fixed relative to hub 56a and spring ring 58a. Additionally, the at least one tab plate tab 122a contacts the at least one wall, e.g., the walls of the helical slots of spring ring 58a and hub 56a. Alternatively, during a freewheel condition of the one way clutch, tab plate 60a rotates relative to hub 56a and spring ring 58a. Additionally, the at least one tab plate tab 122a contacts the at least one spring ring tab 80a. Spring ring 58a via the position of tabs 80a relative to the slots of hub 56a allows movement of tabs 122a in one direction only, while preventing rotation in the opposite direction.

In some embodiments, the one way clutch further comprises stator casting 100a and connection plate 102a. Stator casting 100a comprises outer circumferential edge 104a having a plurality of stator blades 106a arranged thereabout and an inner circumferential edge having a casting spline arranged thereon. Connection plate 102a comprises an outer circumferential edge having second spline 114b arranged on the inner surface of spline 114a. Connection plate outer spline 114a is adapted to rotationally engage the casting spline, while second spline 114b is arranged to rotationally engage spline 92a. In view of the foregoing, it should be appreciated that tab plate 60a moves axially along second spline 114b as the one way clutch progresses between lockup and freewheel conditions, i.e., as tabs 122a move within the slots of hub 56a and spring ring 58a.

In other embodiments, first wall 64 further comprises at least one opening 124 therethrough, second wall 76 further comprises at least one dimple 126 therein, and the at least one dimple 126 is positioned within the at least one opening 124.

As described supra, torque converter stators may be in at least two states, e.g., a lockup condition or a freewheel condition. During a lockup condition, the at least one spring ring tab 80 is in contact with edge 128 of the at least one hub helical slot 72. It should be appreciated that due to the foregoing arrangement, tabs 80 are flexible in one direction, i.e., the freewheel direction shown by curved uni-directional arrow 99a, and are inflexible in the opposite direction, i.e., the lockup direction shown by curved uni-directional arrow 99b. Alternatively, during a transition from a freewheel condition to a lockup condition, the at least one spring ring tab 80 is arranged to guide the at least one tab plate tab 92 into the at least one hub helical slot 72. In other words, as tabs 92 cease rotating outside of slots 72, i.e., a transition from a freewheel condition to a lockup condition, tabs 80 prevent the rotation of tab plate 60 in a direction opposite the freewheel direction and thereby guide tabs 92 back within slots 72.

In some embodiments, tab plate 60 further comprises contact face 130. During a lockup condition, contact face 130 is driven into surface 132 of hub 56. In this instance, any torque applied to tab plate 60 will be applied to hub 56 via the interface of contact face 130 and surface 132 and via the interface of tabs 92 and slots 72. Additionally, it should be appreciated that in some embodiments, one way clutch 52 is axially contained within stator casting 100 by incorporation of additional components. For example, connection plate 102 may be retained within stator casting 100 via snap ring 134, while one way clutch 52 may be retained within stator casting 100 via the assembly of bushing 136, side plate 138 and snap ring 140. One of ordinary skill in the art appreciates that other methods of retaining the components within the stator casting are also possible, e.g., staking the side plate, and such variations are within the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A one way clutch arranged for coupling a transmission having a stator shaft to a torque converter stator, wherein said torque converter stator comprises an axis of rotation, said one way clutch comprising:
   a hub comprising an outer circumferential edge having a first wall extending perpendicularly therefrom and an inner circumferential edge having a hub spline arranged thereon, said first wall comprising at least one hub slot, each of said at least one hub slot has a first length;
   a substantially cylindrical spring ring comprising a second wall, said second wall comprising at least one spring ring slot and at least one spring ring tab arranged adjacent to an open end of said at least one spring ring slot and forming at least a portion of an edge of said at least one spring ring slot, each of said at least one spring ring slot has a second length greater than said first length, said at least one hub slot in registered alignment with said at least one spring ring slot and said at least one spring ring tab arranged within and adjacent to said at least one hub slot and extends radially therethrough; and,
   a tab plate comprising a circumferential edge having at least one tab plate tab extending radially therefrom, said tab plate arranged axially and rotationally displaceable relative to said hub and said spring ring, said at least one tab plate tab is arranged within said at least one hub slot and/or said at least one spring ring slot,
   wherein during a lockup condition of said one way clutch, said tab plate is rotationally fixed relative to said hub and said spring ring and said at least one tab plate tab contacts at least one wall of said at least one hub slot and/or said at least one spring ring slot, and during a freewheel condition of said one way clutch, said tab plate rotates relative to said hub and said spring ring and said at least one tab plate tab contacts said at least one spring ring tab.

2. The one way clutch of claim 1 wherein said hub comprises a hub outer diameter, said spring ring comprises a spring ring inner diameter larger than said hub outer diameter, said at least one spring ring tab extends radially inwardly towards said axis of rotation, said circumferential edge of said tab plate is an outer circumferential edge and said at least one tab plate tab extends radially outwardly therefrom.

3. The one way clutch of claim 2 further comprising:
   a stator casting comprising an outer circumferential edge having a plurality of stator blades arranged thereabout and an inner circumferential edge having a casting spline arranged thereon; and,
   a connection plate comprising an outer circumferential edge having a connection plate outer spline arranged thereon and an inner circumferential edge having a connection plate inner spline arranged thereon, said connection plate outer spline adapted to rotationally engage said casting spline,
   wherein said tab plate further comprises an inner circumferential edge having a tab plate spline arranged thereon, said tab plate spline adapted to rotationally engage said connection plate inner spline.

4. The one way clutch of claim 1 wherein said hub comprises a hub outer diameter, said spring ring comprises a spring ring outer diameter smaller than said hub outer diameter, said at least one spring ring tab extends radially outwardly away from said axis of rotation, said circumferential edge of said tab plate is an inner circumferential edge and said at least one tab plate tab extends radially inwardly therefrom.

5. The one way clutch of claim 4 further comprising:
   a stator casting comprising an outer circumferential edge having a plurality of stator blades arranged thereabout and an inner circumferential edge having a casting spline arranged thereon; and,
   a connection plate comprising an outer circumferential edge having a connection plate outer spline arranged thereon, said connection plate outer spline having an inner surface with a second spline arranged thereon, said connection plate outer spline adapted to rotationally engage said casting spline,
   wherein said tab plate further comprises an outer circumferential edge having a tab plate spline arranged thereon, said tab plate spline adapted to rotationally engage said second spline.

6. The one way clutch of claim 1 wherein said first wall further comprises at least one opening therethrough, said second wall further comprises at least one dimple therein, and said at least one dimple is positioned within said at least one opening.

7. The one way clutch of claim 1 wherein during said lockup condition, said at least one spring ring tab is in contact with an edge of said at least one hub slot.

8. The one way clutch of claim 1 wherein during a transition from said freewheel condition to said lockup condition, said at least one spring ring tab is arranged to guide said at least one tab plate tab into said at least one hub slot.

9. The one way clutch of claim 1 wherein said at least one hub slot is a helical slot, a linear slot or a curved slot.

10. The one way clutch of claim 1 wherein said at least one spring ring slot is a helical slot, a linear slot or a curved slot.

* * * * *